No. 632,642. Patented Sept. 5, 1899.
W. L. CASADAY.
ROTARY ENGINE.
(Application filed Feb. 8, 1898.)
(No Model.) 5 Sheets—Sheet 1.
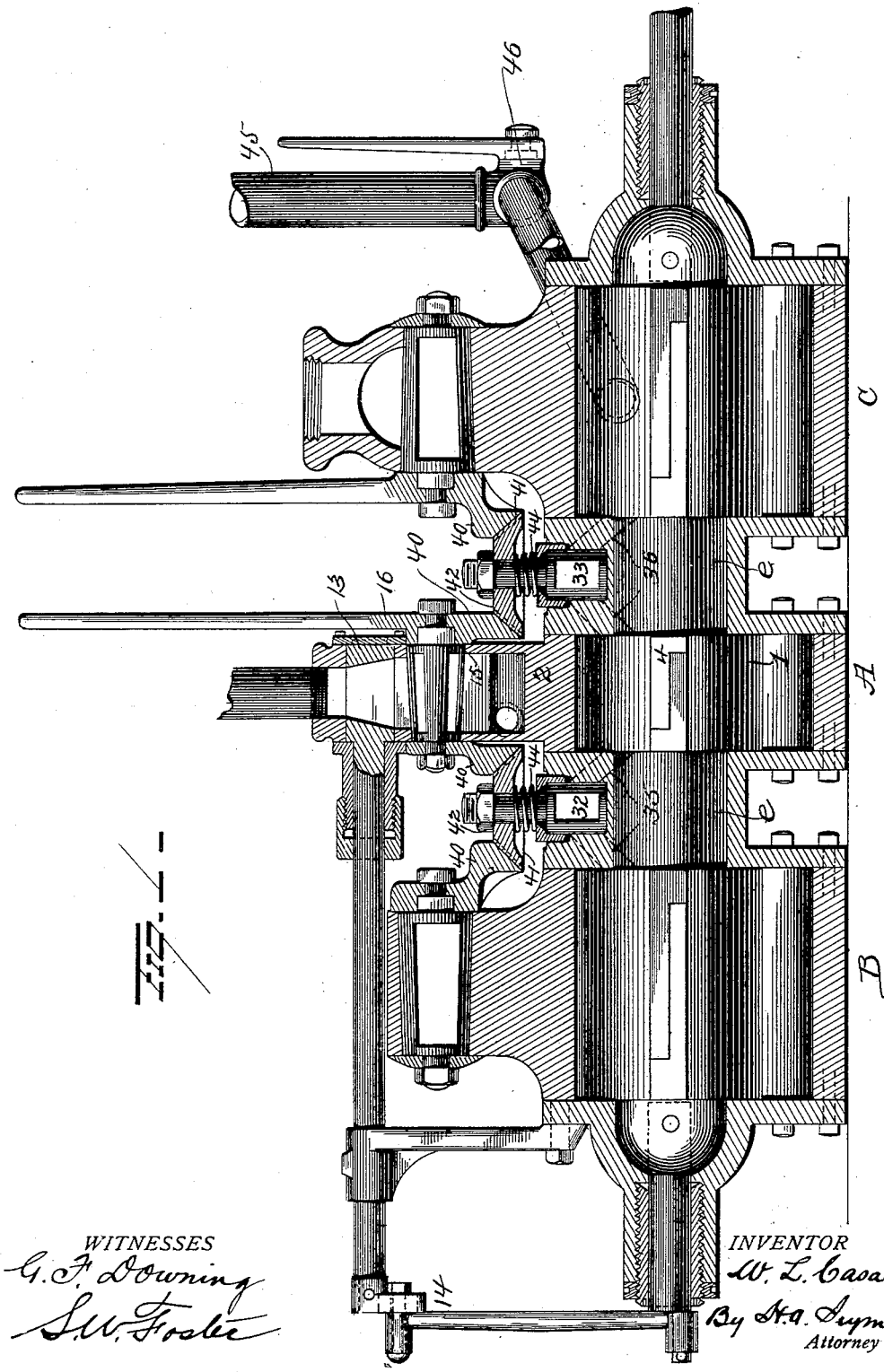
WITNESSES
G. F. Downing
S. W. Foster
INVENTOR
W. L. Casaday
By H. a. Seymour
Attorney
THE NORRIS PETERS CO., PHOTO-LITHO., WASHINGTON, D. C.

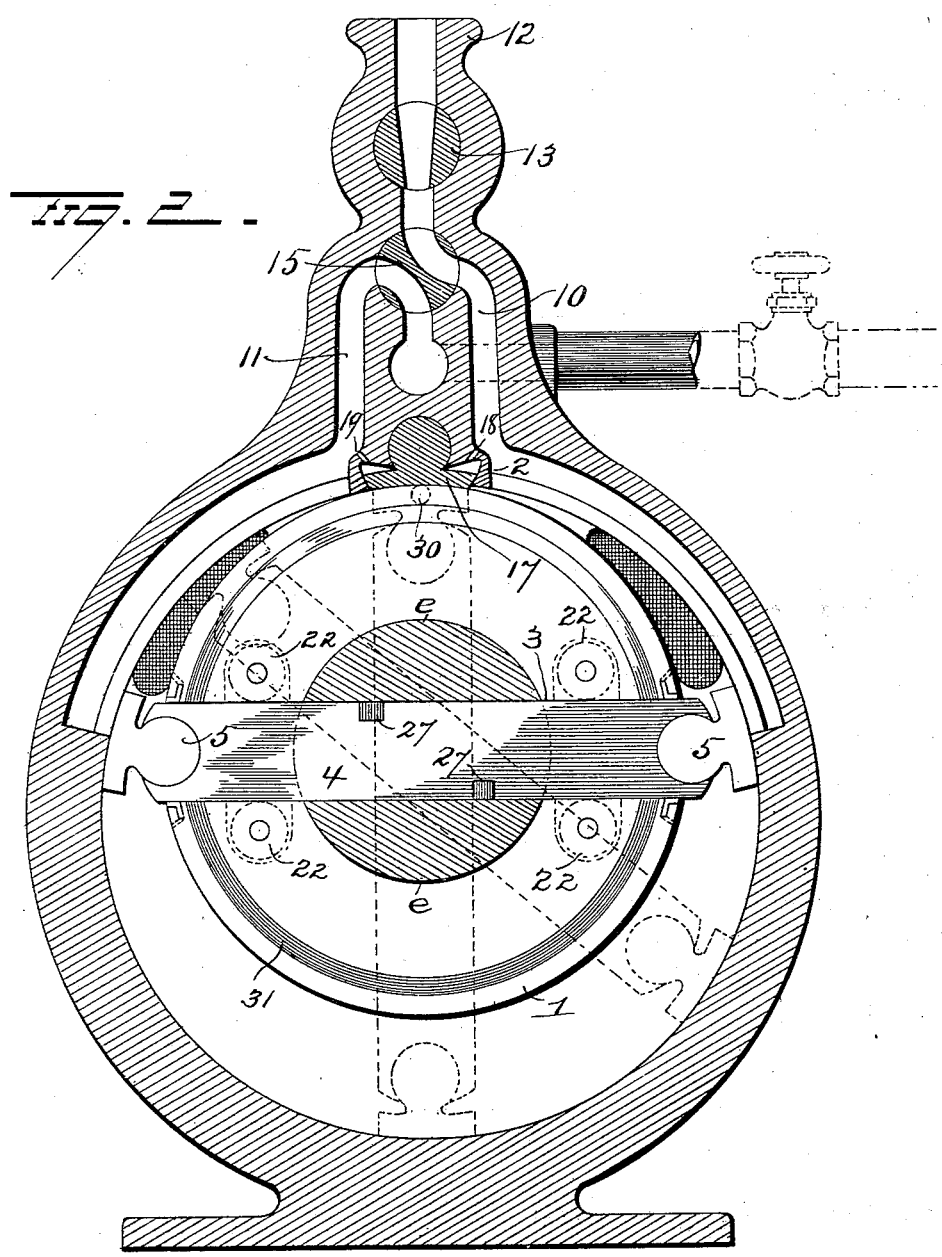

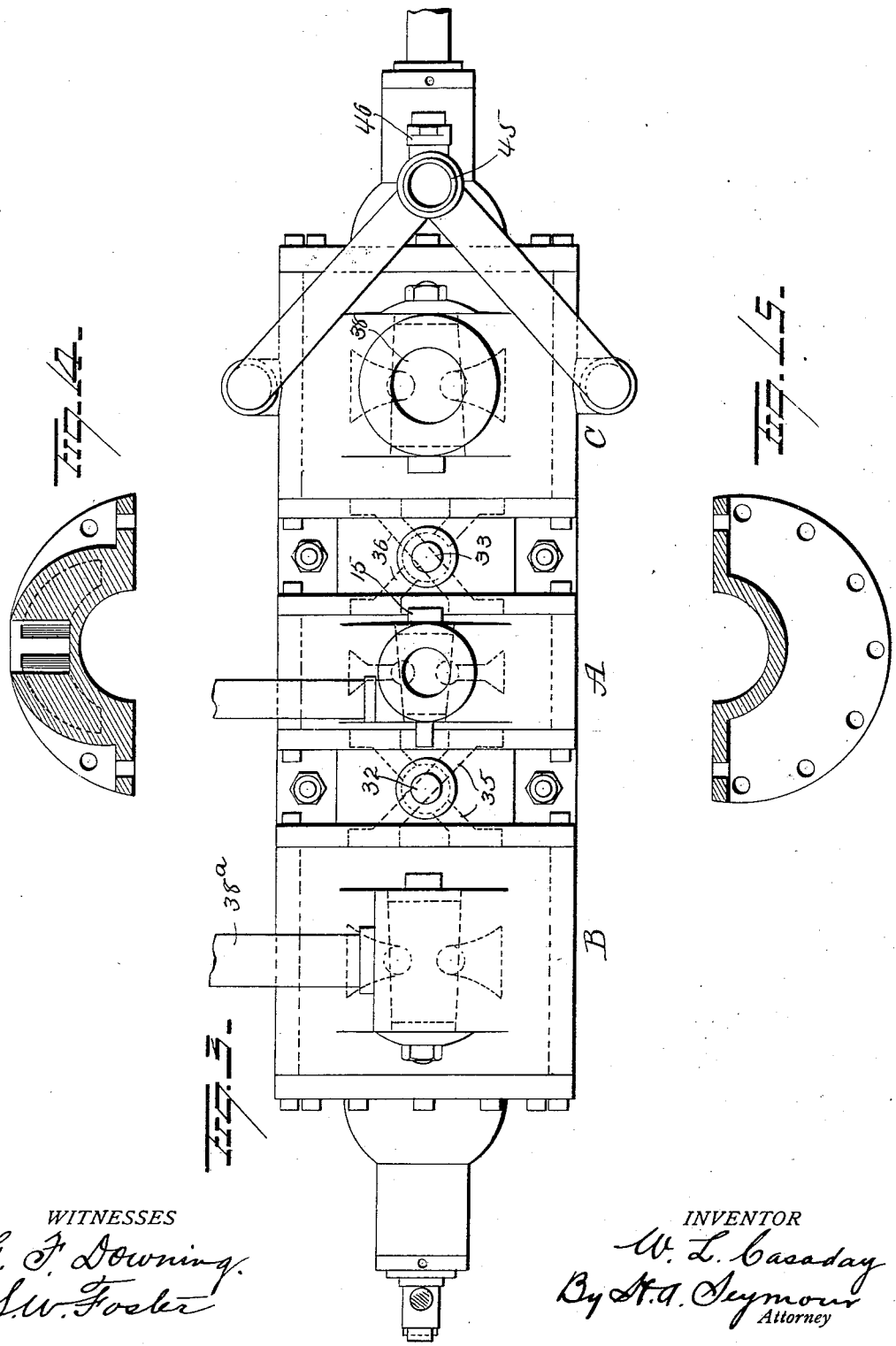

No. 632,642. Patented Sept. 5, 1899.
W. L. CASADAY.
ROTARY ENGINE.
(Application filed Feb. 8, 1898.)
(No Model.) 5 Sheets—Sheet 4.
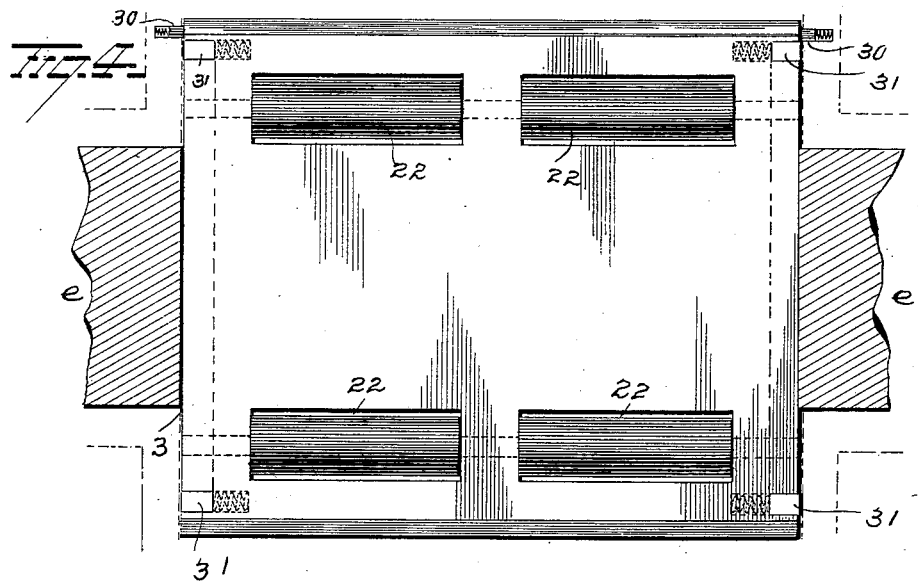
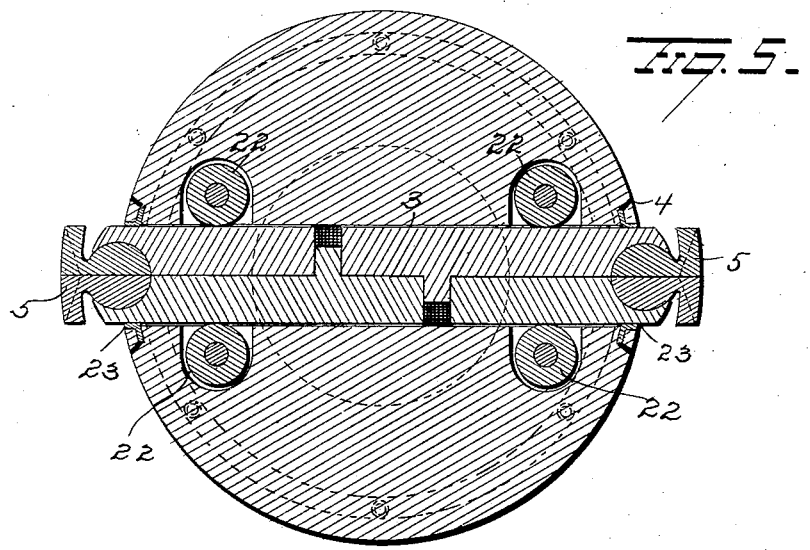
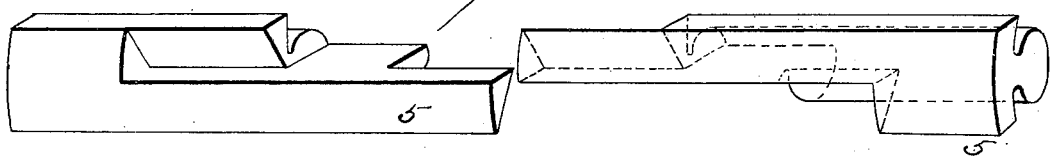
WITNESSES
G. F. Downing
S. W. Foster
INVENTOR
W. L. Casaday
By H. A. Seymour
Attorney

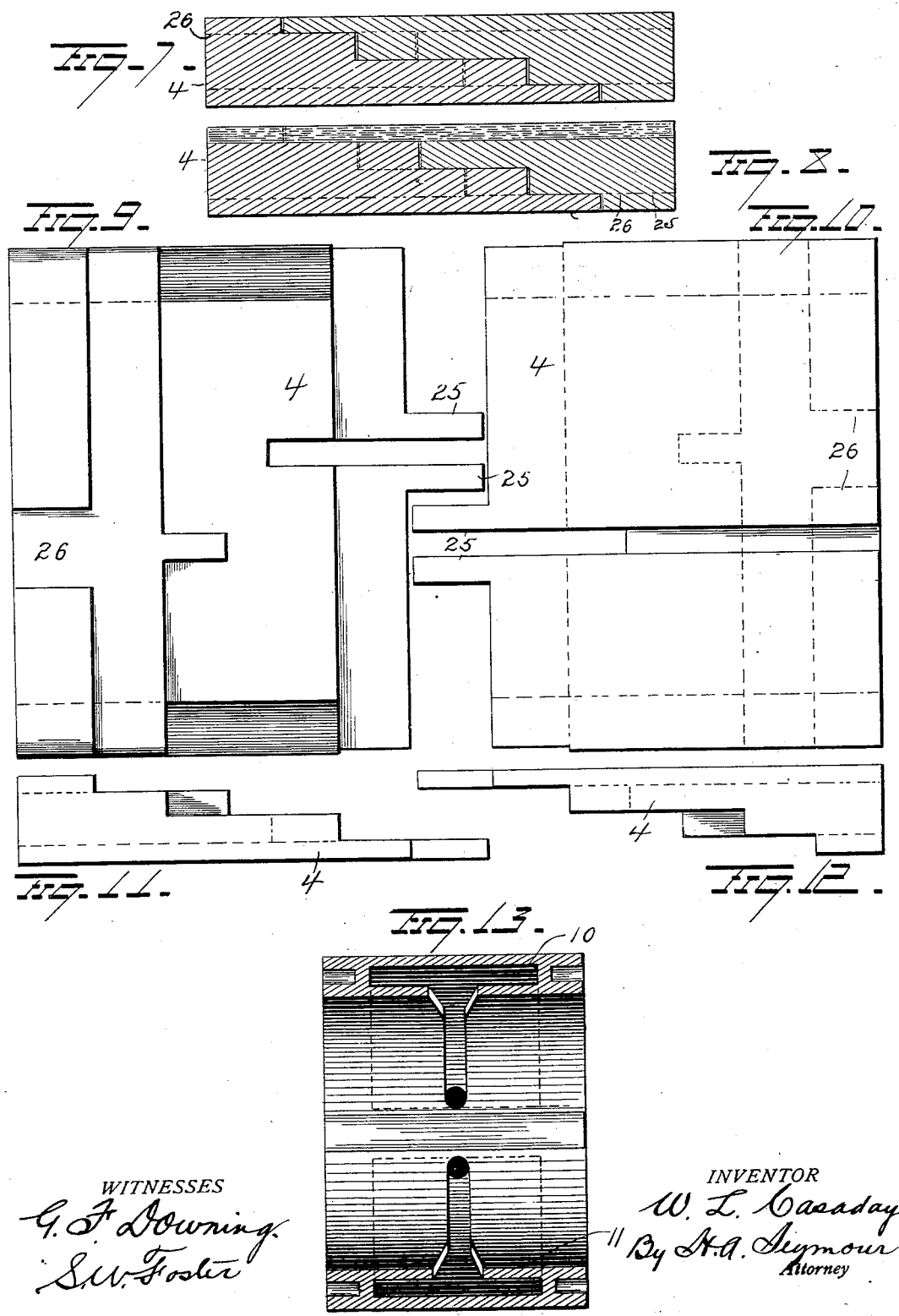

UNITED STATES PATENT OFFICE.

WILLIAM L. CASADAY, OF SOUTH BEND, INDIANA.

ROTARY ENGINE.

SPECIFICATION forming part of Letters Patent No. 632,642, dated September 5, 1899.

Application filed February 8, 1898. Serial No. 669,581. (No model.)

*To all whom it may concern:*

Be it known that I, WILLIAM L. CASADAY, of South Bend, in the county of St. Joseph and State of Indiana, have invented certain new and useful Improvements in Rotary Engines; and I do hereby declare the following to be a full, clear, and exact description of the invention, such as will enable others skilled in the art to which it appertains to make and use the same.

My invention relates to an improvement in rotary engines, and that class, more particularly, which is capable of being run as a single, duplex, triple, or quaduple engine, as the requirements may demand, the primary object being to utilize to the greatest advantage the full power of the steam by preventing all leakage and dead-centers, and, in short, obtain a maximum of power and speed with a minimum expenditure of steam; and the invention consists in certain novel features of construction and combination, and arrangements of parts, as hereinafter set forth, and pointed out in the claims.

In the accompanying drawings, Figure 1 is a longitudinal vertical section of a compound engine, showing three cylinders. Fig. 2 is an enlarged transverse section through the central engine shown in Fig. 1. Fig. 3 is a plan of the construction shown in Fig. 1, the link mechanism being broken away. Fig. 4 is a sectional view of the piston, taken through the axial cavity. Fig. 5 is a cross-section through the piston and plunger. Fig. 6 is a detail view showing one of the shoes carried by the plunger. Figs. 7, 8, 9, 10, 11, and 12 are details of the plunger, and Figs. 13, 14, and 15 are details of parts of the engine.

In Figs. 1 and 2 three cylinders are illustrated. The central one, A, is a high-pressure cylinder, and the larger-sized cylinders B and C, arranged on either side of the high-pressure cylinder, are low-pressure cylinders when the engine is used as a triple compound engine. Provision is made, as will be explained, for using the central engine A alone, or the two engines A and B together, or the three, A, B, and C, together, or engine C alone, or more engines might be added until the expansive power of the steam is exhausted without departing from the principle of the invention in the slightest. The several cylinders and pistons are to all intents and purposes the same, and it is only necessary to describe one. Attention will therefore be directed to the high-pressure cylinder A for the time being. The bore of this cylinder is not an exact circle, but, on the contrary, is an ellipse of such dimensions that all lines equal in length to its shortest diameter will intersect at a common point somewhere outside of the centers of the ellipse. The ellipse is formed by two circles whose centers are slightly removed from each other. These two centers may be attained in the following way: by first striking one circle, which of course determines one center, then drawing a line perpendicular to the vertical diameter of this circle equal in length to said diameter and intersecting it a distance from its upper end equal to half the diameter of the piston to be used. Two other lines of the same length are then drawn through the intersecting point midway between the first two lines drawn. From the right-hand ends of these three lines as centers intersecting arcs are drawn with a radius equal to that of the first circle. The point where these three arcs intersect is the center from which the second circle is struck, it passing through the outer right-hand ends of the three diameters, a half of a circle from each center constituting half of the ellipse. The point of intersection of the three diameters, or as many more as might be drawn, coincides precisely with the center of the piston. From the foregoing we deduce the following rule: that the ellipse of the cylinder must have such dimensions that all of its diameters passing through the center of the rotary piston will be of uniform length.

The numeral 1 represents the piston. It is cylindrical in form and centered as described, so that it always touches the cylinder at one point—namely, at the bulkhead 2, which intervenes between the ports—thus leaving all possible space between its opposite surface and the corresponding part of the cylinder, for a purpose to be hereinafter stated. This piston has cavity 3 extending its entire length and subdividing the piston into halves. The plunger 4 is fitted to this cavity and is slid transversely therein by the cam action of the cylinder upon its two ends, which are in constant engagement therewith and thereby cause a gradual and continuous movement first one way and then the other. At the outer edges of the plunger shoes 5 5 are pivoted, they being adapted to rock slightly to accommodate their outer surfaces to the constantly-varying curvature of the cylinder with relation to the center of the piston. Thus the entire outer surface of these shoes impinges the wall of the cylinder, forming a steam-tight joint, and the construction of the shoes is such that the steam striking the back of the shoe always tends to increase the tightness of this joint.

The ports are indicated by the two numerals 10 and 11, the former acting as the live-steam port when the engine is turning forward, as in Fig. 2, and port 11 as the exhaust, and just the reverse when the engine is reversed. Steam is introduced through pipe 12, and its entrance is controlled by the cut-off valve 13, operated in the usual way from the shaft of the engine through the link motion 14. (Shown in Fig. 1.) Reversing-valve 15 is provided for reversing the motion of the engine, and this is operated by a lever 16. To effect a steam-tight joint at the bulkhead, the rocker 17 is provided. This bears constantly upon the surface of the piston at its closest point of proximity to the cylinder-wall and is kept tight against the piston by the pressure of live steam through one or the other of the ducts 18 or 19, as the case may be, the pressure derived in this way being just sufficient to pack the joint and to tilt the rocker-valve sufficiently to insure a clearance of the edge toward the approaching plunger of the latter upon reaching it. The action of the steam upon the piston is briefly as follows: Steam does not begin to act upon the plunger until the live-steam port is closed or just prior to its reaching the position shown in full lines at the right of Fig. 2. The steam in the live-steam port is shut in by the cut-off valve and acts by its expansive power upon the plunger until it reaches a point where the other end of the plunger closes the live-steam port. The exhaust-port opens just after the steam begins to act on the other end of the plunger, so as to give just enough lead to prevent the steam from blowing. When the engine is reversed, it takes just the opposite course. The cut-off valve is regulated to give more or less steam and might of course be dispensed with. Its use is of course preferable, because in that way the head of steam may be regulated, and, besides, the expansive action of the steam is utilized. As the steam impact is always very much in excess on the live-steam side of the plunger of any back pressure of exhaust-steam on the other side, the friction of the plunger is very great. Especially is this true of a non-reversible engine, which gets no lubricant in the exhaust side of the plunger. To prevent this friction, the antifriction-rollers 22 22 are placed in the piston in position to bear on the sides of the plunger. To further pack these plungers, the plates 23 23 are made to bear upon them, ports being provided for steam to enter behind them. Thus far nothing has been said of the means for packing the plunger proper. This I accomplish by making the plunger expansible. The plunger is made in two interlocking parts which are slid outward by the expansive power of the steam which enters between the parts. These parts are so constructed that the steam cannot pass through from one edge to the other, the projections 25 25 on one section passing into corresponding recesses 26 26 in its counterpart. The shoes at the edges are correspondingly constructed. This interlocking might be effected in the greatest variety of ways, and hence I do not in any wise limit myself to the arrangement shown, which is only one of a variety of possible constructions. In addition to these interlocking parts the plunger is provided with packings in the grooves 27 27. To further insure against any leakage of steam beneath the rocker, which also may be made expansible, a spring-actuated plug 30 is employed to bear on the piston at this point in the space outside of the spring-actuated packing-ring 31 in the ends of the piston. By this construction of plunger any sticking of the piston at the start due to unequal expansion of parts is overcome. Especially is this so when the plunger is fitted hot, as it is.

From the foregoing the object of the elliptical formation of the cylinder will be readily understood, as it is the only possible construction which will accommodate a plunger of unvarying length turning on a center not coincident to the center of the cylinder and always form a perfect steam-tight joint with both ends of the plunger. No difference really exists between the other cylinders and pistons except in size and the connecting-shafts $e$ $e$ between intermediate pistons which serve as hubs in the frame of the engine. When one or both of the other cylinders are used, one or both of the valves 32 and 33 are opened, as the case may be—that is, one is opened if one cylinder only is used and both valves are opened if both are set in operation. These two valves are located at the intersection of the cross-ports 35 36, and they serve as reversing-valves, the cross-ports being provided for the purpose. It is essential, of course, that the exhaust-steam enter the low-pressure cylinder or cylinders on the same side of the piston as in the high-pressure engine, or, in other words, that the live steam enter on the same side in every cylinder for the reason, as previously explained, that all the pistons are on one shaft. This is the object of the diagonal arrangement of the ports, and the same principle holds good for effecting a reversal of the engine, and hence the two diagonal ports crossing each other to form the so-called "cross-ports" 35 and 36. Each low-pressure cylinder is provided with an exhaust-port $38^a$. As a convenient means for operating all of these reversing as well as exhaust valves 38 38 simultaneously they are intergeared by means of segments 40 40 and bevel-pinions 41 41, so that by manipulating the hand-lever 16 all these valves are turned by one movement of the lever 16. When it is desired to cut out one or both of the outer cylinders, the nuts 42 on the stems of the valves 32 and 33 are screwed down against the action of the springs 44 until the bevel-gears are out of engagement with the segments.

It is sometimes desirable to use the large right-hand engine alone. For this purpose I have equipped it with an independent steam-pipe 45. This divides, as shown, to let steam in on either side, and a three-way valve 46 is provided for controlling the direction of the steam and for reversing. When one or two or any number of engines less than all are used, of course the valve from one to the one cut out is closed.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In an engine, the combination with a cylinder and a piston therein having longitudinal grooves in its periphery, of a sliding plunger in the piston between said grooves, packing-plates in the grooves in the piston, said plates being angular in cross-section with the flat faces of one member bearing against the plunger, and steam-ducts for admitting steam behind the other member of each plate, substantially as set forth.

2. In an engine, the combination with two or more cylinders and pistons, cross-ports, reversing-valves, main reversing-valve and exhaust valve or valves, segments and pinions connecting the valves, and means for holding the pinion or pinions out of engagement with the segments to cut off one or more engines.

In testimony whereof I have signed this specification in the presence of two subscribing witnesses.

WILLIAM L. CASADAY.

Witnesses:
S. G. NOTTINGHAM,
A. W. BRIGHT.